Jan. 6, 1970  G. B. FOSTER  3,488,581
SURFACE INTERRUPTION CALIBRATED NON-CONTACT TRANSDUCER SYSTEM
Filed Oct. 3, 1967  3 Sheets-Sheet 1

INVENTOR
GEORGE B. FOSTER
BY
Le Blanc & Shur
ATTORNEY

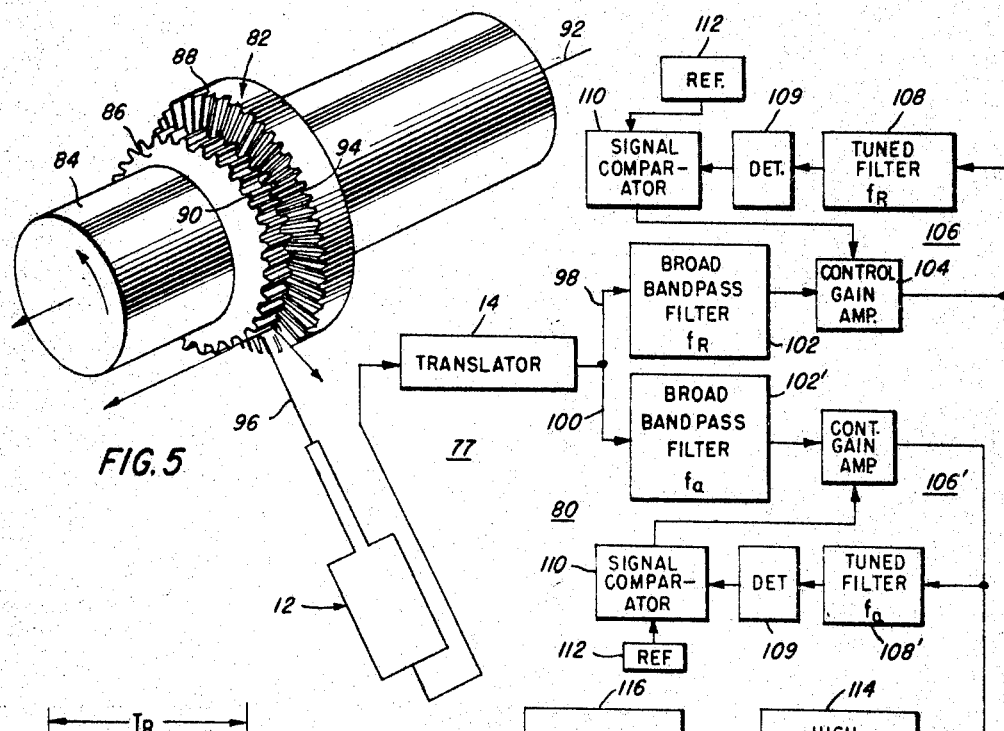
FIG. 5
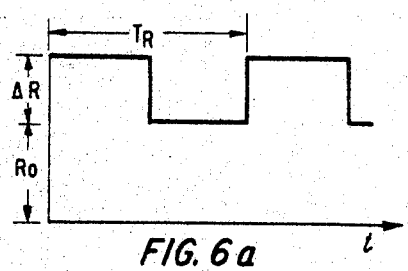
FIG. 6a
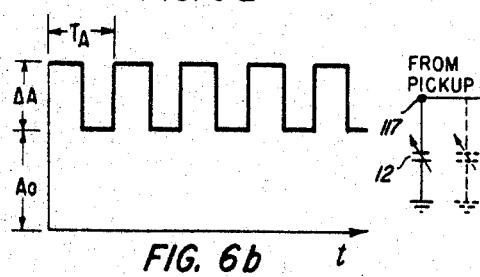
FIG. 6b
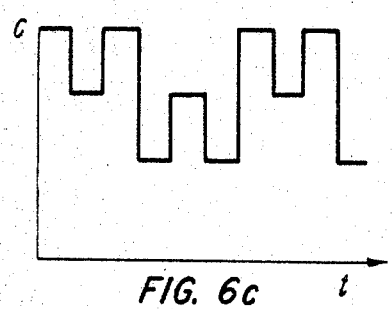
FIG. 6c
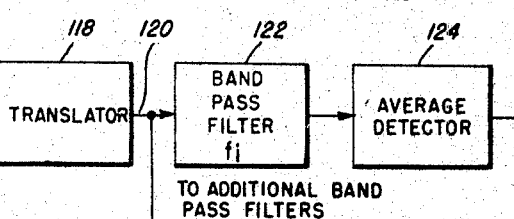
FIG. 7
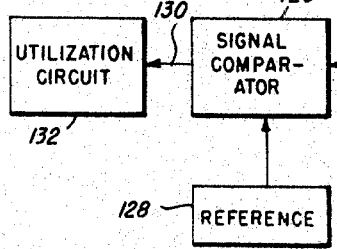

United States Patent Office 3,488,581
Patented Jan. 6, 1970

3,488,581
SURFACE INTERRUPTION CALIBRATED NON-CONTACT TRANSDUCER SYSTEM
George B. Foster, Worthington, Ohio, assignor to Reliance Electric & Engineering Co., Columbus, Ohio, a corporation of Ohio
Filed Oct. 3, 1967, Ser. No. 672,602
Int. Cl. G01r 27/26
U.S. Cl. 324—61
28 Claims

ABSTRACT OF THE DISCLOSURE

A system is described for non-contact measurement of vibration or dimensional comparison capable of directional response along one or more axes. The system comprises a pickup responsive to distance dependent energy variations, signal processing means, and automatic gain control means to adjust the incremental system sensitivity independent of the static operating point. Also described is an interrupted surface calibration member co-operating with the object under inspection to produce an apparent cyclic variation in the pickup to object spacing, the pickup response to which is employed to adjust the incremental sensitivity of the system. Directional measurement is achieved by proper design of the calibration member and by appropriate demodulation of the pickup output component associated with the apparent cyclic variation of the pickup to object spacing.

---

The present invention relates to the non-contact measurement of dimensions or vibration in a machine or other object under inspection, and more particularly to a non-contacting transducer system which is continuously calibrated on the basis of incremental system response to the known characteristics of an interrupted calibrating surface.

Numerous transducer systems have been developed for the purpose of measuring dimensions and displacement both for operational monitoring and for assessment of dimensional accuracy during manufacturing or assembly. Early developments in this area were characterized by contact devices responsive to the position of the object under inspection (or its time derivatives) which relied on pickup movement or seismic response of the measuring pickup to generate a measurable electrical variation. Such systems, however, were subject to several disadvantages, including limited low frequency response, limited dynamic range, etc. Moreover, the attachment of the sensing element to the object under investigation frequently resulted in disturbance of the mechanical system to such an extent that meaningful measurement was not obtainable.

Non-contact measurement systems have been proposed as a solution to the foregoing difficulties but substantial problems were encountered in the areas of calibration and standardization of system sensitivity in the face of environmental variations and inherent non-linear pickup sensitivity.

Many of the difficulties with non-contacting pickup systems have been overcome by the employment of continuous calibration techniques such as disclosed in the present assignee's U.S. Patent No. 3,180,136, to George B. Foster, entitled Continuously Calibrated Displacement Measuring Transducer System. Briefly, according to the continuous calibration technique of the Foster patent, a pickup sensitive to energy variations in space is positioned near, but not in contact with the object under inspection, and is subjected to a controlled cyclic variation in position relative to the object under inspection. System calibration is achieved by control of the overall transducer system gain, i.e., sensitivity, by comparison of the actual system response to the calibrating displacement with a reference or desired response.

The above described continuous calibration technique has been found to produce excellent results under a wide variety of operational conditions whereby the concept of a non-contacting transducer system has been transformed from a mere laboratory phenomenon to a practical and useful test device.

For certain applications, however, it has been found that the transducer systems disclosed in the aforementioned Foster patent are subject to certain limitations which limit their availability for universal use. For example, it has been found that under certain conditions, objects other than those actually under inspection tend to modify the energy effects to which the pickups are responsive. Under such conditions, the pickups employed in the Foster patent tend to exhibit a substantial degree of omnidirectionality. Thus, vibration or displacement other than that actually under observation is sensed by the pickup with consequential appearance of unwanted signals in the pickup output. This is undesirable not only since the unwanted signals tend to mask the desired signals but also because the continuous calibration of the Foster system is quite directional, i.e., system sensitivity is only controlled with respect to measurements of movement parallel to the calibrating displacement. Thus, for directional vibration measurement of a complex mechanical structure, or for dimensional comparison or position measurement in two or more directions, modification of the basic concepts taught in the Foster patent has been necessary.

In assignee's U.S. patent application No. 672,488, entitled Sequentially Switched, Incrementally Calibrated Non-Contacting Transducer System, filed concurrently herewith in the name of George B. Foster, there is disclosed a modification of the basic system of the Foster Patent 3,180,136 wherein continuous calibration is achieved by sequentially switching between a pair of axially displaced energy sensitive pickups to provide an apparent calibrating displacement fully equivalent to that of the basic Foster system. However, due to the freedom from actual mechanical vibration, it is possible to produce a highly directional pickup system useful both for dimensional comparison and position detection as well as for vibration analysis. Moreover, the system according to the aforementioned Foster application is readily adaptable to the measurement of both minute and extremely large displacements over an extremely wide frequency range extended even beyond the broad range provided by the system of the basic Foster patent.

The switched pickup concept of the Foster application yields a versatile and accurate system, but like its predecessor is not of universal utility due to certain limitations. For example, the switched pickup transducer is somewhat complex and costly and provides accuracy, sensitivity, and high frequency response which is beyond the needs of many applications. On the other hand, such applications may require the directional sensitivity of the switched pickup system. As another example, the switched pickup transducer does not readily lend itself in terms of size and flexibility of installation to the convenient measurement of vibration or position along multiple axes, yet these very applications require the directional sensitivity available with the switched pickup transducer.

The present system, therefore, is intended to complement the non-contacting transducer systems of the aforementioned Foster patent and copending application and to provide a relatively simple but accurate transducer system capable of highly directional response and of use, if desired, for multiple axis measurement. Moreover, in those applications for which omnidirectional response may be more desirable, the transducer system of the present invention offers an attractive alternative to the systems disclosed in the basic Foster patent due to its relative simplicity and minimum occupation of space.

According to this invention, a continuously calibrated non-contacting transducer system is provided having a non-vibrating pickup and an interrupted surface either integral with or affixed to a rotating portion of the object being inspected. The interrupted surface is so designed that rotation thereof causes a controlled apparent variation of the distance between the pickup and the object under inspection. System calibration is maintained by continuous adjustment of the system sensitivity to provide a desired incremental response to the positional variation independent of the position of the pickup relative to the interrupted surface, and of any environmental variations such as temperature changes, contamination, long term variations of pickup sensitivity, etc.

The interrupted surface and the electronic components of the transducer system are so designed that the directional response is achieved over a relatively wide frequency range and in such a manner as to permit convenient adaptation to multiple axis measurement if desired.

When used for multiple axis measurement, the interrupted surface is so designed to provide a controlled apparent variation between the pickup and the object under inspection in two or more directions. The multiple variations are of distinctive character to facilitate identification and separation for processing by separate data channels. Each channel is separately calibrated by maintaining its incremental response to the associated known surface interruption independent of separation distance or environmental effects.

Accordingly, it is a general object of the present invention to provide an improved non-contacting continuously calibrated transducer system.

It is an additional object of this invention to provide a non-contacting continuously calibrated transducer system in which the need to impart calibrating motion to the pickup is eliminated.

It is a further object of this invention to provide a continuously calibrated non-contacting transducer system including a pickup sensitive to energy variations in space and including an interrupted calibration surface for creating an apparent variation in the distance between the pickup and the object under inspection.

It is a related object of this invention to provide a surface interruption calibrated non-contacting transducer system as described above in which the incremental sensitivity of the system is continuously adjusted in accordance with the system response to the apparent variation caused by the interrupted surface.

It is an additional object of this invention to provide a continuously calibrated non-contacting transducer system characterized by substantially directional sensitivity.

It is a related object of this invention to provide a directional transducer system of the foregoing type characterized by relative simplicity and small size.

It is a further object of this invention to provide a directional, non-contacting transducer system which is readily adaptable to multiple axis measurement.

It is a related object of this invention to provide a multiple axis transducer system including a calibrating surface characterized by interruptions of a distinctive and identifiable nature in each measurement direction.

It is a further object of this invention to provide a non-contacting transducer system characterized by a pickup sensitive to energy variations in space, an interrupted calibration surface for providing an apparent variation, along one or more axes, of the position of the object under inspection relative to the pickup, and by signal processing means to control the transducer sensitivity in accordance with its incremental response to the apparent variation caused by the interrupted surface.

It is a related object of this invention to provide a transducer system as described above including means for extracting directional vibration or dimension information from modulation of the pickup output signal component related to the apparent variation due to the interrupted surface.

The exact nature of this invention, as well as other objects and advantages thereof will become apparent from consideration of the following detailed description in conjunction with the attached drawing in which:

FIGURE 1 is a generalized schematic diagram of the non-contacting inspection system according to this invention;

FIRURE 2a is a schematic diagram of a pickup and interrupted surface in accordance with this invention;

FIGURE 2b is a waveform diagram showing in idealized form, certain characteristics of the system of FIGURES 1 and 2a;

FIGURE 5 is a generalized schematic diagram of a multiple axis inspection system according to this invention;

FIGURES 6a–6c are idealized representations of output waveforms for the pickup of the system of FIGURE 5; and FIGURE 7 is an adaptation of the system of FIGURE 5 for single or multiple axis position measurement.

Figure 1:
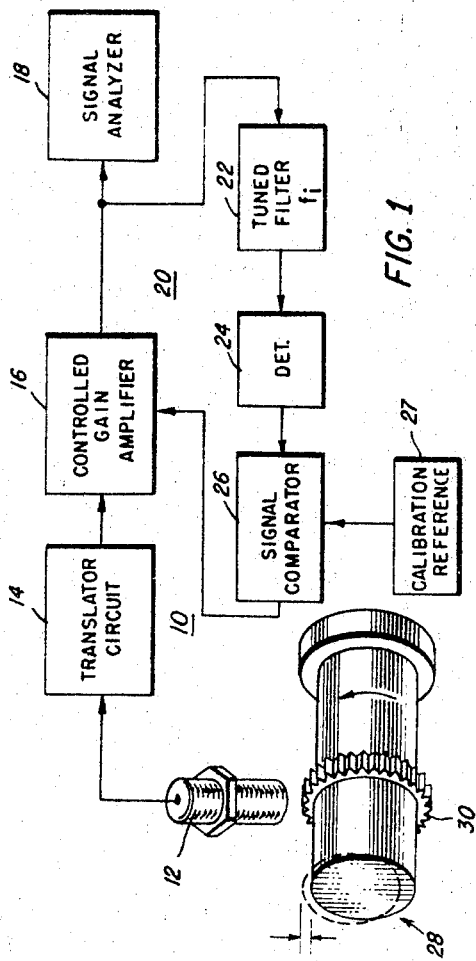

Referring first to FIGURE 1, a transducer system according to this invention, generally denoted at 10, comprises a pickup 12, suitable translator circuitry 14, a controlled gain amplifier 16, and signal analyzer circuitry 18, in series connection as shown. The gain of amplifier 16, and accordingly, the overall sensitivity of the system is controlled by an automatic gain control (AGC) feedback loop 20 comprising a calibration filter 22, a detector 24, a signal comparator 26, and a calibration reference signal generator 27.

Transducer system 10 is adapted for inspection of an object 28 shown, by way of example, as a rotating shaft subject to radial vibration.

Figure 2B:
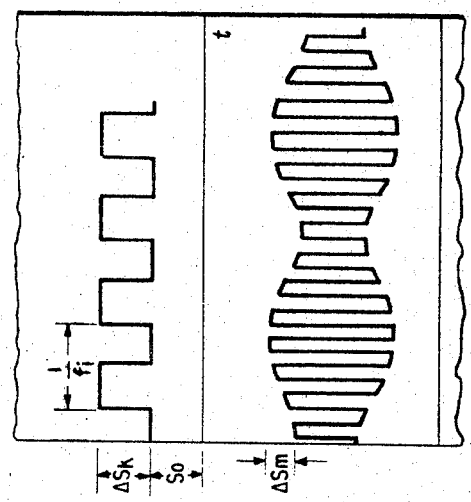
Figure 2A:
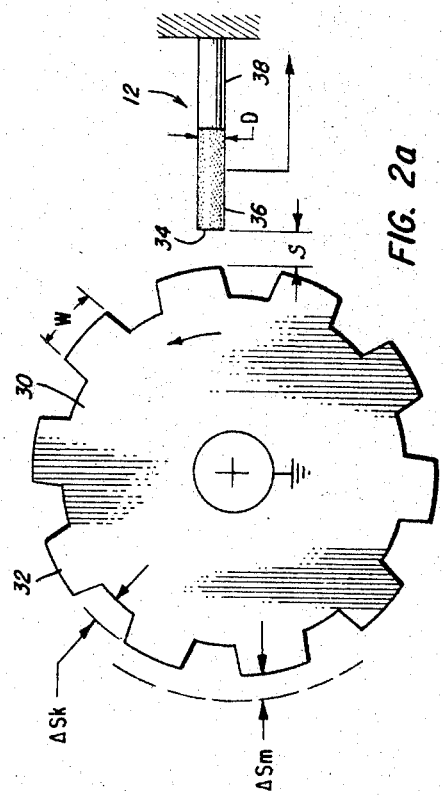

An interrupted surface calibration member 30 is positioned on shaft 28 in axial alignment with pickup 12 and serves to establish a controlled apparent varation in the distance between the pickup and the object under observation. As shown in FIGURE 2a, interrupted surface calibration member 30 is an annular ring, the periphery of which is comprised of a series of serrations or teeth 32 having a root-to-crown dimension $\Delta S_k$ and a width W. As will be appreciated, the number of teeth 32 and the rotation speed of ring 30 will determine the surface interruption frequency $f_i$. Thus, the passage rate of serrations 32 with respect to non-contacting pickup 12 is given by the relationship:

$$f_i = \frac{n \times \text{r.p.m.}}{60} \quad (1)$$

where r.p.m. is the primary rotation speed of object 28 under inspection. Thus, in accordance with the expected shaft r.p.m., the number of teeth should be selected to produce the desired interruption frequency. The value of $f_i$ may be subject to some variation, but is preferably outside of the range of expected vibration frequencies to insure maximum system bandwidth. However, in order to obtain directional sensitivity, the frequency $f_i$ should be several times the highest expected vibration frequency, $f_{v(\max)}$, e.g., $f_i$ at least about $4f_{v(\max)}$, with a value of $f_i$ equal to about $10f_{v(\max)}$ being preferred in practice.

By employment of an appropriate energy sensitive pickup, it is possible to provide an electrical signal analog of the instantaneous separation distance between calibration ring 30 and the pickup. In particular, from a point of observation 34 on the tip of pickup 12, a perfectly circular, non-vibrating ring 30 rotating as shown in FIGURES 1 and 2a, would appear as an interrupted surface with a substantially instantaneous variation between a first position $S_0$ and a more distant position $S_0+\Delta S_k$ with the switching frequency $f_i$ determined in accordance with Equation 1 above. Thus, for spatially dependent energy effects, an appropriate pickup would produce a separation analog in the form of a biased square wave such as shown by the upper waveform in FIGURE 2b.

On the other hand, if ring 32 is not perfectly circular, or if the shaft on which it is rotating is subject to radial vibration, then the apparent surface undulation is considerably more complex. For the very simplest case, that of shaft vibration or runout of amplitude $\Delta S_m$ at some frequency $f_v$, the instantaneous location of the ring surface and, correspondingly, the instantaneous value of the pickup output is determined by superposition of:

(a) A steady state component, i.e., an apparent average position determined by the static standoff position $S_0$;

(b) A time varying component of frequency $f_v$, having a peak-to-peak amplitude of $\Delta S_m$; and (c) A component at center frequency $f_i$ amplitude modulated in accordance with the vibration or runout at frequency $f_v$.

As will be understood, for a multiple frequency vibration or runout, the apparent surface undulation will be considerably more complex than that outlined above.

In any event, due to their omnidirectional sensitivity, it is found that for many pickups, the displacement analog signal components (a) and (b), identified above, include not only the desired information, but also components due to other objects in the vicinity of the pickup. On the other hand, component (c) identified above, and shown in the lower portion of FIGURE 2b, is unique in that it is associated solely with calibration ring 30, i.e., it will depend only on the position and/or vibration of the ring itself. If it is possible in some way to identify and separate this component of the position analog signal, then the system of FIGURE 1 may be utilized for detection of radial vibration without concern for vibration or even presence of objects off the pickup axis.

As mentioned above, numerous types of pickups sensitive to distance dependent energy variations in space may be utilized in accordance with this invention. Several pickups suitable for this purpose are described in the aforementioned Foster U.S. Patent No. 3,180,136. Among the suitable types are variable reluctance pickups, Hall effect pickups, variable capacitance pickups, optical pickups, eddy current pickups, etc. As will be appreciated, the particular application will often determine the type of pickup most suitable.

For example, a capacitive type pickup would be satisfactory for observing the vibration or position of a conducting member. Such a capacitance pickup is shown schematically in FIGURE 2a as comprising a conducting sensitive portion 36 and an insulating portion 38. Pickup 12 may either be rigidly supported in place with respect to the vibrating object or may be hand held, i.e., may be part of a portable inspection device adapted to be carried from one inspection location to another.

The exact dimensions of pickup 12 will depend on the intended application. However, certain basic criteria should be met. For example, satisfactory results can usually be achieved if probe tip 36 is in the form of a slender circular rod having a diameter D less than or equal to the peripheral width W of each of serrations 32. Best results are achieved, however, for a pickup diameter D relatively small in comparison to width W, with a value of D less than or equal to about ½W being preferred. Pickups of diameter between about 10 and 20 mils have been employed with excellent results.

Referring again to FIGURE 1, the output of pickup 12 is provided through suitable translator circuitry 14 which serves to amplify, or otherwise modify the pickup output and to present the same in an optimum form for further processing. For example, in the case of the capacitive pickup described above, translator 14 converts the capacitance variation due to object displacement into an electric current or voltage, the amplitude of which is related to the capacitance variation.

The translator output is connected to controlled gain amplifier 16 which provides the calibration and sensitivity adjustment functions required. Amplifier 16 is controlled by AGC feedback loop 20 including calibration frequency filter 22, AGC detector 24, comparator 26, and calibration reference source 26. Calibration frequency filter 22 is a tuned filter of any suitable design having as a center frequency, the surface interruption frequency $f_i$. Filter 22 is preferably quite selective whereby to pass only the frequency $f_i$ and no other information frequencies present in the translator output. The filter output is connected to a detector circuit 24 which converts the signal amplitude at the calibration frequency $f_i$ into a DC level. The detector output is coupled to voltage comparator circuit 26 which compares the detector output with a signal level established by calibration frequency signal generator 27. The output of the comparator circuit 26 is connected by lead 40 to the gain control input of amplifier 16 and serves to adjust the system sensitivity. The output of amplifier 16 is also provided to signal analyzer 18 which includes suitable circuitry for processing directional or omnidirectional pickup information as required.

As previously explained, the operation of pickup 12 depends upon sensitivity to spatially dependant energy effects. Typically, such effects are inversely related to some function of distance whereby the pickup incremental sensitivity to a distance variation $\Delta S$ from an initial position $S_0$ will depend in part upon the values of both $S_0$ and $\Delta S$. Thus, considering the arrangement shown in FIGURE 2a, the apparent cyclic variation $\Delta S_k$ of the distance between pickup 12 and calibration ring 30 will produce a cyclic variation of pickup capacitance $C_k$, the magnitude of which depends inversely on the standoff distance $S_0$. In other words, the system sensitivity G is a non-linear relationship such that:

$$G=\frac{\Delta C}{\Delta S}=f(\Delta S, S) \tag{2}$$

Accordingly, system response to an unknown vibration would depend on the separation between the pickup and the vibrating object, as well as upon the vibration amplitude. Moreover, environmental factors such as temperature or contamination could also affect the value of G, whereby Equation 2 above actually should read:

$$G=f(\Delta S, S, \text{various environmental} \tag{2'}$$
$$\text{and other factors)}$$

Unless the incremental sensitivity G of the system can be maintained constant, independent of stand-off position or other factors, meaningful measurement is not possible. As will be understood, the particular sensitivity desired may be selected in advance and the gain of amplifier 16 adjusted to produce such sensitivity. This sensitivity can be maintained constant in accordance with this invention by AGC feedback loop 20 as described below.

Irrespective of any radial or other vibration of shaft 28, the apparent pickup to object spacing S can be continuously varied due to serrations 32. Thus, whenever shaft 28 is rotating, the output translator circuit 14 includes a component at interruption frequency $f_i$, having an amplitude which, as explained above, depends on the standoff distance S as well as on the serration depth $\Delta S_k$.

This component, along with the other signal components is passed by controlled gain amplifier 16 to calibration frequency filter 22 which rejects all frequencies except $f_1$ and provides the latter to detector 24. Here, the sinusoidal signal $f_1$ is rectified, preferably by means of an average detector to smooth out any variations in serration depth, and the resulting DC level is compared with a preset reference 27 representing the average value which results when the incremental sensitivity is at the desired value. If changes in standoff distance or other environmental effects cause variation of the system sensitivity, the AGC signal on lead 40 serves to adjust the gain of amplifier 16 to return the system sensitivity to that required to produce a zero error between calibration reference 27 and the average value of the apparent vibration at frequency $f_1$. In this way, the incremental sensitivity of the system remains constant for signals at the frequency $f_1$. The overall system frequency response is substantially constant over all frequencies of interest. Therefore the entire system's sensitivity to all frequencies passing through controlled gain amplifier 16 is continuously maintained at the desired level.

Figure 3:
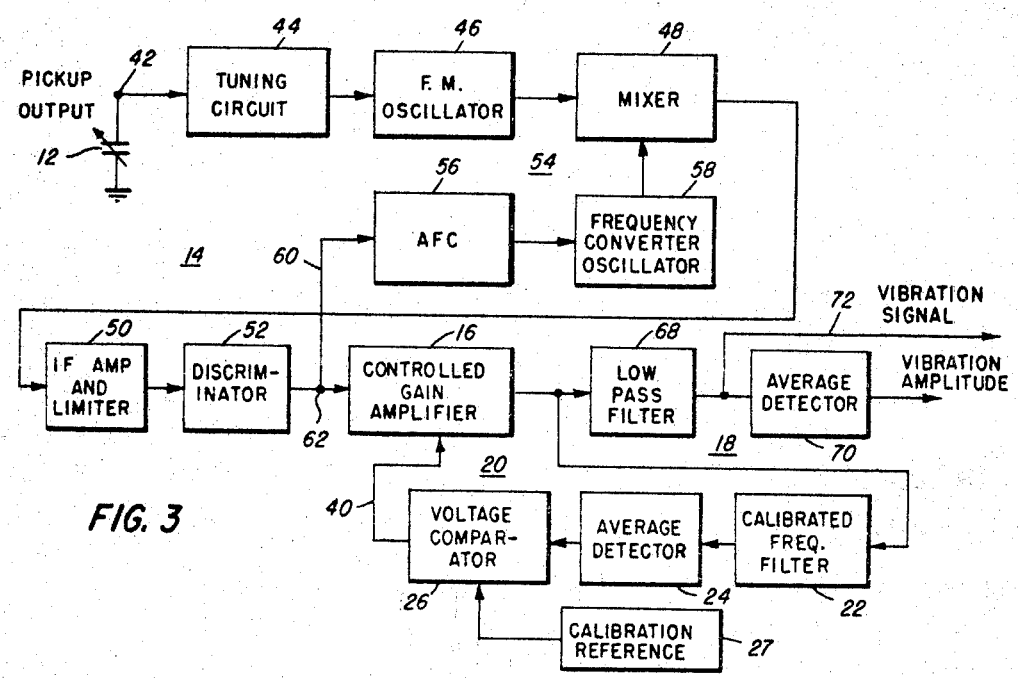
FIGURE 3 is a detailed electronic block diagram showing a practical embodiment of the transducer system according to this invention which may be used to provide continuously calibrated non-directional vibration measurements.

With reference now to FIGURE 3, there is shown a practical embodiment of the transducer system of FIGURES 1 and 2a, adapted for use with a capacitive pickup. (For convenient comparison, like portions of FIGURES 1 and 3 [and subsequent figures as well] are denoted by like reference numerals.) The system shown includes a pickup 12 simply represented as a variable capacitance between ground and an output terminal 42. Capacitor 12 is connected to translator circuit 14 including a tuning circuit 44, a frequency modulated oscillator 46, a mixer 48, an IF amplifier and limiter 50, and a discriminator 52. Translator 14 also includes a frequency control feedback loop 54 having an AFC circuit 56 and a variable frequency oscillator 58. Variable capacitance pickup 12, tuning circuit 44 and FM oscillator 46 cooperate to form a series tuned variable RF oscillator. The variable capacity appearing at terminal 42 thus serves to modulate the output of FM oscillator 46 whereby to convert the distance variations sensed by pickup 12 into a frequency deviation about an RF carrier. The frequency deviation depends on the instantaneous separation between the pickup and the object under inspection, while the rate of deviation depends on the various frequencies at which the surface displacements occur.

The output of FM oscillator 46 passes through a mixer 48 which effects a frequency conversion of the modulated signal to any desired intermediate frequency under the control of frequency conversion oscillator 58. The mixer output is provided through an IF amplifier and limiter 50, and a discriminator 52 to convert the varying frequency output of oscillator 46 into a variable emplitude analog signal for further processing. The design of IF amplifier and limiter 50 and of discriminator 52 is conventional though in the case of discriminator 52, circuitry providing an extremely linear response is preferred.

The discriminator output is provided over lead 60 to a frequency control feedback loop 54 including a conventional AFC signal generator 56 which adjusts the output frequency of conversion oscillator 58. In this way, the intermediate frequency output of mixer 48 is maintained near the center of the most linear region of sensitivity of discriminator 52 irrespective of the actual frequency of oscillator 46. The above described circuit configuration is particularly adapted for use with the variable capacitance pickup since it serves to convert an impedance variation at terminal 42 to a voltage amplitude analog at the output of discriminator 52. For other types of pickups, it should be understood that other configurations for translator circuitry 14 may be preferred.

In addition to delivery over lead 60 to AFC loop 54, the output of discriminator 52 is connected through controlled gain amplifier 16 to adjust the overall system sensitivity as described above. An automatic gain control loop 20 again includes tuned calibration frequency filter 22 passing the frequency $f_1$, average detector 24, and a comparator circuit 26 connected to the output of average detector 24 and to calibration reference signal source 27. As previously explained, the use of average detector 24 is preferred since it permits smoothing of any cycle-to-cycle variation in the root and crown dimensions of serrations 32 shown in FIGURE 2a. The output of detector 24 is therefore representative of the average value of the system incremental response to a known average displacement.

Voltage comparator 26 is preferably a differential amplifier adapted to compare the DC output of average detector 24 with the DC level provided by calibration reference source 27. The difference signal is provided as described in connection with FIGURE 1, over lead 40 to adjust the gain of amplifier 16 thereby setting the overall system sensitivity to signal variation at the calibration frequency $f_1$. Again, due to the broad frequency response of the system, calibration at all frequencies of interest is simultaneously assured.

Signal analyzer 18 shown in FIGURE 1 represents suitable means to extract information intended to be transduced by the system. In the embodiment shown in FIGURE 3, the signal analyzer comprises a low pass filter 68 and an average detector 70. Low pass filter 68 serves to reject those signal components in the output of controlled gain amplifier 16 above the maximum expected frequency of vibration signals to be sensed. Thus, apparent vibration signals at the calibration frequency $f_1$ and any associated amplitude modulation signals are blocked. The output of low pass filter 68 may be provided over a lead 72 for spectrum analysis or other conventional processing well known in the field of vibration measurement.

The above described practical embodiment of the system of FIGURE 1 shares many features with the systems described in the aforementioned Foster U.S. Patent No. 3,180,136 but includes the added advantage of avoiding the necessity of actually vibrating the pickup to establish a known calibrating vibration. The system of FIGURE 3 requires that the actual signal processing accomplished by signal analyzer 18 be based on analysis of the static and slowly time varying signals in the pickup output actually representative of the variable under observation. As explained above, and in copending application Ser. No. 672,488, this results in substantially omnidirectional sensitivity for pickup 12 which may be undesirable under certain circumstances.

On the other hand, the so-called signal component (c) identified above and shown in the lower portion of FIGURE 6c, can be employed to produce extremely directional pickup sensitivity if a sufficiently high interruption frequency $f_1$ relative to the expected frequencies of vibration can be established. Due to mechanical limitations on vibrating pickups, a sufficiently high vibration frequency $f_1$ may be unattainable in many practical situations. In contrast, by providing a pickup 12 of sufficiently small diameter D (see FIGURE 2a) and a sufficiently large number of serrations 32 on ring 30, the required high interruption frequency may be attained in many instances.

For example, with a shaft rotation speed of 3600 r.p.m., and a calibration ring diameter of about 5 inches, directional vibration measurement for a vibration frequency in the range of about 1200–2400 Hz. is quite practical. A vibrating pickup such as those disclosed in Foster Patent No. 3,180,136 would be required to vibrate at frequencies of between 12,000 and 24,000 Hz. to achieve satisfactory directional operation, an unrealistic demand in practice.

Figure 4:
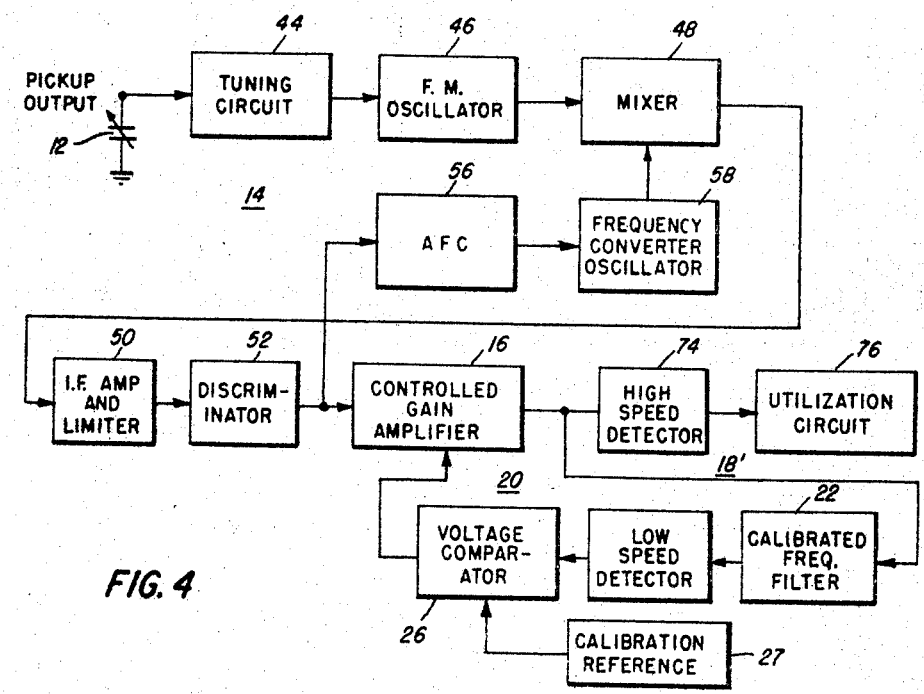
FIGURE 4 is a detailed electronic block diagram similar to that of FIGURE 3 showing a modified embodiment of a vibration transducer adapted to provide directional response along one axis.

FIGURE 4 shows a practical realization of the system of FIGURE 1 adapted for directional measurement as described above. The circuitry shown is substantially identical to that of FIGURE 3 including an identical pickup 12, an FM translator circuit 14, a controlled gain amplifier 16 and a sensitivity control loop 20 as previously described. The systems differ in the design of calibration ring 30 and in the signal analyzer here designated as 18′.

As explained above, in the case of calibration ring 30, a sufficient number of serrations 32 are provided so that the interruption frequency $f_i$ in accordance with Equation 1 above satisfies the requirement:

$$f_i \geq m x f_{v(max)} \quad (3)$$

where $f_{v(max)}$ is the maximum expected vibration frequency and where $m$ is a minimum of about 4, but preferably about 10. If Equation 3 is satisfied, the pickup output will include a capacity variation in the form of amplitude modulation shown in the lower waveform of FIGURE 2b which waveform can readily be processed to extract the directional vibration information, i.e., the vibration component in a direction parallel to the apparent calibrating vibration at frequency $f_i$. Such processing can best be achieved by the use of a signal analyzer 18′ including a high speed detector 74.

Detector 74 is of conventional circuit configuration including rectifying and filtering circuitry of any type desired. However, from comparison of FIGURES 3 and 4, it will be noted that a low pass filter corresponding to filter 68 in FIGURE 3 is not present in the embodiment of FIGURE 4. In fact, detector 74 is particularly adapted to respond to the portion of the spectrum associated with the amplitude modulation of the interruption frequency $f_i$, which information was rejected by filter 68 in FIGURE 3. Thus, the integration constant of detector 74 must be sufficiently short to provide effective demodulation of the entire modulation sideband spectrum. An integration constant of about $1/10 f_{v(max)}$ is quite satisfactory in practice.

The output of high speed detector 74 is connected to any suitable utilization circuit 76, for example a recorder or spectrum analyzer for further processing in any desired manner, as will be appreciated from the foregoing description. Thus, by the utilization of a system as shown in FIGURE 4, it is possible to achieve a highly directional vibration pickup capable of utilization over a wide frequency range with high accuray and convenience wherever it is possible to install the interrupted surface calibration ring on the object to be inspected.

Another highly advantageous application for the interruption calibrated transducer described above is in the area of multiple axis vibration and position measurement. A system for this purpose is shown in FIGURE 5. The system generally denoted at 77 includes a vibration pickup 12 and translator circuitry 14 identical to that described above in connection with FIGURES 3 and 4. The system also includes separate processing channels 78 and 80 of generally similar construction adapted to provide independent sensitivity control and directional multiple axis signal processing as explained below.

The multiple axis transducer system is adapted to cooperate with a multiple surface calibration ring 82 affixed to a rotating shaft 84, the vibration of which is to be measured. Calibration ring 82 comprises a pair of segments 86 and 88, the former carrying a series of equally spaced serrations 90 extending parallel to the axis 92 of shaft 84. Ring segment 88 includes a similar series of equally spaced serrations 94 extending radially outward from shaft 84. Thus, when shaft 84 rotates there will result an apparent periodic variation in the axial position of surface segment 86 and a similar variation in the radial position of reference surface segment 88.

As shown, a single pickup 12 is employed. Thus, differentiation between the axial and radial surface interruptions is necessary if direction signal processing is to be possible. This is achieved by preparing ring segments 86 and 88 with a different number of serrations or teeth 90 and 94 whereby the apparent interruption frequencies $f_a$ and $f_r$ are unequal. For example, operation is satisfactory if the number of serrations 90 on segment 86 is ⅓ the number of serrations 94 on segment 88. On the other hand, the interruption frequencies $f_a$ and $f_r$ should both be at least about 10 times the expected frequencies of vibration for successful directional operation. This must also be considered in determining the number of serrations on ring 82.

Pickup 12 is rigidly positioned with respect to dual surface ring 82, preferably in axial alignment with the bisector 96 between ring segments 86 and 88. For a perfectly formed shaft 84, and calibrating ring 82, i.e., not subject to runout and rotating in a substantially vibration free manner, the waveforms shown in FIGURES 6a–6c are schematically representative of the output of pickup 12. In FIGURE 6a it may be seen that serrations 90 on ring segment 86 cause a periodic variation $\Delta R$ about a mean standoff radius $R_0$ while the serrations 94 on ring segment 88 cause an apparent axial displacement of $\Delta A$ from a mean axial position $A_0$. The radial interruption rate $f_r$ is determined by the number of serrations 90 while the axial interruption rate $f_a$ is determined by the number of serrations 94. For the simple case of no vibration or runout of shaft 84, the combined effects of the displacements $\Delta R$ and $\Delta A$ produce a capacity variation which is found to equal the summation of the capacity variations caused by each component separately. This is shown in FIGURE 6c. In other words, as an electrical circuit element, the calibration ring 82 and pickup 12 may be thought of as two capacitances in a parallel circuit arrangement each cyclicly varying at a different frequency $f_a$ and $f_r$.

Assuming now the presence of runout or vibration in rotating shaft 84, it will be understood that the combined waveform representing the capacity variation at the output of pickup 12 will include a superposition of two separate amplitude modulated square waves (centered at the two interruption frequencies) representative of axial and radial components of shaft vibration.

Referring again to FIGURE 5, the complex capacity variation described above serves as a frequency control for an FM oscillator/discriminator circuit combination included in translator circuit 14 which converts the capacity variation of pickup 12 into an amplitude analog of the displacements (both real, due to vibration, and apparent, due to surface interruptions) of calibration ring segments 86 and 88. The signal output of translator 14 is connected by means of lead 98 as the input to signal processing channel 80. Channel 98 includes a broad bandpass filter 102, a controlled gain amplifier 104, an automatic gain control feedback loop 106 including a tuned filter 108, a detector 109, a signal comparator 110 and a reference source 112, a high speed detector 114 and a suitable utilization circuit 116. Processing channel 80 is identical to that described above except for the employment of a modified bandpass filter 102′ and tuned filter 108′ in the automatic gain control loop 106′.

Bandpass filter 102 in processing channel 78 is centered at the radial interruption frequency $f_r$ and is of sufficient bandwidth to pass the portion of the spectrum associated with the expected vibration induced amplitude modulation. Similarly, bandpass filter 102′ is centered at the axial interruption frequency and is of sufficiently broad bandwidth to pass the entire expected amplitude modulation spectrum of this signal. Since interruption frequencies $f_a$ and $f_r$ are at least about 10 times the expected maximum vibration frequencies and the two frequencies themselves are separated by a factor of about 3, the spectra associated with each of the center frequencies will be entirely independent and subject to no overlapping. Thus, employment of bandpass filters 102 and 102′ will completely separate the radial and axial information signals.

The remainder of the system shown in FIGURE 5 is substantially identical to that shown in FIGURE 4 although it will be understood that the tuned filters 108 and 108′ are each adjusted to pass only that frequency associated with the radial and axial surface interruptions, respectively. The outputs of filters 108 and 108′ are coupled to respective detector circuits 109 and signal comparators 110 as previously described to maintain fixed the incremental gain of each of channels 78 and 80 to all signals within the passband of the respective amplifiers 104.

The outputs of each of amplifiers 104 are connected through suitable high speed detectors 114 as described above to extract the amplitude modulation information from the interruption frequency carriers $f_a$ and $f_r$. The detector outputs are provided to suitable utilization circuits 116, again in the form of spectrum analyzers, or any other desired equipment.

The system shown in FIGURE 5 is a preferred embodiment of a simple, yet effective, multiple axis directional transducer system capable of measuring vibration over an extended frequency range and of identifying and separating the vibration into radial and axial components. In this regard, however, it should be understood that pickup 12 and associated translator circuitry need not be of the capacity sensitive type shown but may be of any other type suitable to the particular application.

As explained above, the incremental system sensitivity to displacements at the interruption frequency $f_i$ (or in the case of FIGURE 5 at the interruption frequencies $f_r$ and $f_a$) depends both upon the amplitude of the incremental variation and also upon the actual distance between the pickup and the object under observation. Thus, with the calibration rings 30 or 82 described above, it is possible to utilize the known properties of the pickup output to provide dimension or position comparison in the manner described in connection with FIGURE 7.

As shown, a pickup 12 is again represented as one or more variable capacitors between ground and an output terminal 117. The latter is connected through an FM translator 118 to produce a voltage amplitude analog at output terminal 120 as described above. The amplitude analog signal is connected through a bandpass filter 122 for each interruption frequency on the calibration ring employed, and then to an average detector 124. Bandpass filters 122 are each adapted to pass only a single interruption frequency and to reject frequencies representing vibration or runout. The filter output is provided to a detector circuit 124 (an average detector again being preferred to smooth out cycle-to-cycle variation in the root-to-crown dimensions of the serrations on the calibration ring) whereby there is provided a DC signal representative of the incremental system sensitivity at a given standoff distance. The detector output is provided to a signal comparator 126 above.

In the present instance, instead of considering the detector output to represent the incremental system response, it is considered as a measure of the standoff distance S. In other words, the detector output is thought of as a measure of standoff distance in terms of the incremental sensitivity and apparent vibration, $\Delta S_k$. Thus, $$S = f(\Delta S_k, G) \tag{4}$$

Since the functional relationship implied may be measured for a given pickup, Equation 4 may be solved and the system of FIGURE 7 employed for distance measurement or dimension comparison.

Accordingly, the output of reference signal source is made to represent the system response to an apparent vibration $\Delta S_k$ at a reference distance $S_o$. Then, the output of comparator 126 represents the difference between the actual standoff distance and that established by reference 128. Thus, if the non-linear distance sensitivity of the pickup is known, a suitable utilization circuit 132, such as a meter or other display device with non-linear calibration, is employed to indicate departure from the reference standoff distance. As will be appreciated, by the employment of several channels including filters 122, detectors 124, signal comparators 126, and reference generators 128, the location of the pickup relative to the object under inspection may be assessed in several dimensions as desired.

Thus, the various embodiments described above provide transducer systems which complement the transducer systems disclosed in the basic Foster Patent 3,180,126 in areas requiring directional measurement of vibration or displacement along one or more reference axes. It should, however, be understood that the embodiments shown are exemplary and are subject to considerable variation within the scope of this invention. For example, as indicated above, the particular energy sensitive transducer employed will depend on the particular application involved and may be of any suitable non-contacting type sensitive to energy variations stored in fields existing in the space between the pickup and the object under inspection. Correspondingly, for the particular energy sensitive pickup employed, compatible electronic circuitry capable of converting the transduced displacement or position variation into a useful electrical analog signal will be substituted for the FM translator embodiment described.

Moreover, the controlled gain amplifier described herein as a means for adjusting overall system sensitivity may be replaced by any other suitable means for achieving gain control; for example, a servo-controlled potentiometer, a photoresistor, or even a thermistor may be substituted.

At the same time, it should be understood that the operation of the system is not limited to use of the calibrating ring described herein. The interrupted calibrating surface required may be provided in any other suitable manner, for example, by milling or otherwise producing a series of serrations in one or more directions directly on the shaft under observation.

What is claimed and desired to be secured by United States Letters Patent is:

1. A non-contract transducer system comprising pickup means adapted to be positioned in proximity to but not in contact with an object to be observed, said pickup means being sensitive to incremental variations in the pickup-to-object spacing, said pickup incremental sensitivity varying with said pickup-to-object spacing, means on said object for producing a cyclic apparent incremental variation of said spacing, circuit means cooperating with said pickup for producing an electrical signal analog of displacement of said object, said signal analog including a calibration component attributable to said apparent incremental variation, said circuit means including means to compensate for variations of said incremental sensitivity by maintaining the amplitude of said calibration component at a predetermined level.

2. A non-contact transducer system as defined in claim 1 where said means on said object comprises a series of regularly spaced surface interruptions adapted for movement through the field of sensitivity of said pickup, said pickup being so positioned relative to said surface interruptions that passage of the latter through the field of sensitivity of the pickup causes said apparent incremental variation of the pickup-to-object spacing.

3. A non-contact transducer system as defined in claim 2 where said surface interruptions are comprised of a first group of serrations defining an undulation of said surface in a first direction, and at least a second group of serrations defining an undulation of said surface in a different direction and at a different rate than said first undulation, whereby said calibration component of the electrical signal analog is comprised of a portion representative of said first undulation and a portion representative of said second undulation, and where said compensating means includes means for separately maintaining each of said calibration component portions at a desired predetermined level.

4. A non-contact transducer system as defined in claim 1 where said means on said object comprises a ring attached to said object having a substantially regularly interrupted surface thereon, said ring being subject to all displacements of said object to which it is attached, said ring being adapted for rotation whereby to pass said interrupted surface through the field of sensitivity of said pickup, said pickup being rigidly positioned relative to said ring so that passage of said interrupted surface through said pickup field of sensitivity causes said apparent incremental variation in the pickup-to-object spacing.

5. A non-contact transducer system as defined in claim 4 where said interrupted surface is comprised of a series of spaced serrations producing an undulation of said ring surface as said ring is rotated, said apparent incremental variation of pickup-to-object spacing resulting from the undulation of said ring surface as said serrations pass through the field of sensitivity of said pickup.

6. A non-contact transducer system as defined in claim 4 where said interrupted surface on said ring is comprised of a first group of spaced serrations and at least a second group of spaced serrations, said first and said second groups of serrations being so disposed relative to each other that passage of said serrations through the field of sensitivity of said pickup causes an undulation of the ring surface in two distinct directions relative to said pickup, the frequency of said undulation attributable to said first group of serrations being unequal to the frequency of undulation attributable to said second group of serrations.

7. A non-contact transducer system as set forth in claim 1 where said object includes a portion adapted for rotation and where said means on said object comprises a member of generally circular cross section secured to said rotatable portion, said member including a group of regularly spaced serrations thereon defining a radial undulation of the surface thereof in a direction normal to the axis of rotation of said portion of said object, said pickup being so positioned relative to said member that the undulating surface passes through the field of sensitivity of said pickup when said member is being rotated, thereby producing said apparent incremental variation of said pickup-to-object spacing.

8. A non-contact transducer system as defined in claim 7 where said member includes at least a second group of regularly spaced serrations defining an axial undulation of a surface of said member parallel to said axis of rotation, said pickup being so positioned that said second group of serrations passes through the field of sensitivity of said pickup when said member is rotated, whereby said calibration component includes a portion representative of said radial undulation and a further portion representative of said axial undulation.

9. A non-contact transducer system as defined in claim 8 wherein the number of serrations in said first group of serrations is unequal to the number of serrations in said second group of serrations.

10. A non-contact transducer system as set forth in claim 1 where said apparent incremental variation of said spacing is of a fixed frequency and magnitude, said calibration component also being of said fixed frequency and of amplitude dependent upon the effective incremental sensitivity of said transducer system, and where said compensating means includes a filter circuit adjusted to pass signals at said fixed frequency, means coupled to said filter circuit for comparing the magnitude of the filter output with a reference magnitude to produce a difference signal representative of departures from the desired incremental sensitivity of said transducer system, and gain control means for adjusting the electrical signal analog to minimize the amplitude of said difference signal.

11. A non-contact transducer system as described in claim 1 wherein said apparent incremental variation is characterized by a fixed frequency $f_1$ greater than the maximum frequency $f_{v(max)}$ at which displacement of said object relative to said pickup is expected to occur.

12. A non-contact transducer system as described in claim 11 where the frequency $f_1$ exceeds the frequency $f_{v(max)}$ by at least a factor of between about 3 to 10.

13. A non-contact transducer system as set forth in claim 12 further including directional analyzer means for extracting from said electrical signal analog, components representative of displacement of said object relative to said pickup in the direction of said apparent incremental variation of pickup-to-object spacing.

14. A non-contact transducer system as defined in claim 13 wherein said electrical signal analog includes a portion characterized by amplitude modulation, with a carrier at frequency $f_1$, and with side bands corresponding to frequencies $f_v$ at which displacement of said object relative to said pickup is occurring, the amplitude of each side band component being representative of the magnitude of displacement at said frequency, and where said directional analyzer means comprises amplitude modulation detector means responsive to the amplitude modulated portion of said electrical signal analog.

15. A non-contact transducer system as defined in claim 1 where said pickup includes a sensing portion having a maximum dimension D transverse to the direction of said apparent incremental variation, and where said means on said object comprises a series of regularly spaced serrations adapted to pass in a substantially continuous manner through the field of sensitivity of said pickup means, the dimension W of said serrations in the direction of said passage being greater than or equal to the dimension D of said pickup.

16. The non-contact transducer system as defined in claim 15 where the ratio of the dimensions D and W is less than or equal to about 0.5.

17. A non-contact position meausring system for determining the spacing of an object from reference location comprising: pickup means adapted to be positioned in proximity to but not in contact with said object, said pickup means being sensitive to incremental variation in the pickup-to-object spacing, said pickup incremental sensitivity varying with said pickup-to-object spacing; means cooperating with said object and said pickup and having an interrupted surface thereon for producing a cyclic apparent incremental variation of said pickup-to-object spacing; a reference signal source providing a signal representing the value of incremental sensitivity which would exist with said object at said reference location; circuit means for providing an output signal as a function of said apparent incremental variation of said pickup-to-object spacing; and means connected to said circuit means and said reference source for comparing the combined incremental sensitivity of said pickup and said circuit means with the value of incremental sensitivity corresponding to the reference location, and for providing a difference signal representative of departures of said overall effective incremental sensitivity from said reference incremental sensitivity, the magnitude of said difference signal being representative of the displacement of said object from said reference location.

18. A non-contact position measuring system as defined in claim 17 where said interrupted surface is adapted to produce an apparent incremental variation at a frequency $f_1$ and where said means connected to said circuit means comprises filter means responsive to a signal component at frequency $f_1$, detector means coupled to said filter means to generate a D.C. signal representative of the amplitude of said component at frequency $f_1$, a D.C. reference signal source, and means to generate the difference between said detector circuit output and said D.C. reference signal.

19. A non-contact position measuring system as defined in claim 18 where said detector circuit produces an output representative of the average value of said signal component at frequency $f_1$.

20. A non-contact position measuring system as defined in claim 17 where said interrupted surface means comprises a rotatable ring having a surface thereon defining the pickup-to-object spacing, said surface including a series of regularly spaced serrations producing an apparent undulation of said surface when said ring is rotating.

21. A non-contact position measuring system as defined in claim 20 wherein said ring includes at least a second group of serrations defining a second undulation, the frequency of said first undulation being unequal to the frequency of said second undulation; and further including a second reference signal source connected to said comparing means; and wherein said comparing means comprises means for separately comparing the effective incremental sensitivity of the syste for incremental variations of the pickup-to-object spacing at each of said frequencies with one of said reference signals, respectively representative of the incremental sensitivity at said reference location for incremental displacement of said object from said reference location in directions parallel to each of said first and second undulations, and for providing separate output signals representative of such displacements.

22. A non-contact position measuring system as defined in claim 17 where said interrupted surface means comprises a calibrating portion adapted to be rotated with said object, said portion having a generally circular cross section interrupted by a series of serrations regularly spaced around the periphery thereof, said pickup being so positioned relative to said calibrating portion that rotation of the latter causes the passage of said serrations through the field of sensitivity of said pickup in such a direction as to produce an apparent radial undulation of said surface.

23. A non-contact position measuring system as defined in claim 22 where said calibrating portion includes a second series of regularly spaced serrations so positioned relative to said pickup that rotation of said calibrating portion causes an apparent undulation of said pickup-to-object spacing in a direction parallel to the axis of said rotation.

24. A non-contact transducer system for measuring displacements of an object comprising pickup means adapted to be positioned in proximity to but not in contact with said object, said pickup means being sensitive to variations in energy existing in space, means for establishing an ambient energy level in the space between said pickup and said object, said energy being subject to variation in response to changes in the pickup-to-object spacing, means on said object for producing a cyclic incremental variation of the energy existing in said space between said pickup and said object, and circuit means cooperating with said pickup means for producing an electrical signal as a function of the energy existing in said space, said electrical signal including a calibrating component attributable to said incremental energy variation, said circuit means including compensating means responsive to the amplitude of said calibrating component for maintaining a constant functional relationship between the energy in said space and said electrical signal.

25. The non-contact transducer system as defined in claim 24 wherein said compensating means includes gain control means connected to said electrical signal, and means connected to the output of said gain control means and responsive to the amplitude of said calibrating component for adjusting the gain control means to maintain said calibrating component amplitude at a constant value.

26. The non-contact transducer system as defined in claim 24 where said means on said object comprises means for varying the spacing between said pickup and said object.

27. A non-contact transducer system as defined in claim 24 where said means on said object comprises a reference wheel attached to said object having a substantially regularly interrupted surface thereon, said wheel being subject to all displacements of said object to which it is attached, said wheel being adapted for rotation with said object whereby to pass said interrupted surface through the field of sensitivity of said pickup, said pickup being so positioned relative to said ring that passage of said interrupted surface through said pickup field of sensitivity causes said incremental energy variation.

28. A non-contact transducer system as defined in claim 27 where said object is formed of an electrically conductive material, and where said pickup comprises an electrically conductive member electrically insulated from said object, whereby said pickup is responsive to variations of electric field energy in the space between said pickup and said object.

References Cited

UNITED STATES PATENTS 3,379,972    4/1968    Foster et al. _____ 324—61

OTHER REFERENCES

Foster, G. B.: Non-Contacting Self-Calibrating Vibration Transducer, Instruments & Control Systems, vol. 36, pp. 83–84, December 1963.

EDWARD E. KUBASIEWICZ, Primary Examiner

U.S. Cl. X.R.

73—462; 324—34